United States Patent
Chung et al.

(10) Patent No.: US 10,710,028 B2
(45) Date of Patent: Jul. 14, 2020

(54) MULTILAYER COMPOSITE MEMBRANE

(71) Applicant: Industrial Technology Research Institute, Hsinchu (TW)

(72) Inventors: Li-Han Chung, Miaoli County (TW); Min-Fei Tsai, Kaohsiung (TW); Guan-You Lin, Hsinchu County (TW); Yen-Cheng Li, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/214,159

(22) Filed: Dec. 10, 2018

(65) Prior Publication Data

US 2019/0388845 A1    Dec. 26, 2019

(30) Foreign Application Priority Data

Jun. 21, 2018   (TW) .............................. 107121273 A

(51) Int. Cl.
*B01D 69/12* (2006.01)
*B32B 5/16* (2006.01)
(Continued)

(52) U.S. Cl.
CPC ........... *B01D 69/12* (2013.01); *B01D 61/002* (2013.01); *B01D 69/10* (2013.01); *B01D 71/56* (2013.01);
(Continued)

(58) Field of Classification Search
CPC .. B32B 5/00; B32B 5/02; B32B 5/022; B32B 5/024; B32B 5/06; B32B 5/08; B32B 5/10; B32B 5/16; B32B 5/22; B32B 5/24; B32B 5/30; B32B 5/32; B32B 9/00; B32B 9/04; B32B 19/00; B32B 19/04; B32B 19/045; B32B 19/06; B32B 27/00; B32B 27/06; B32B 27/08; B32B 27/12; B32B 27/14; B32B 2250/00; B32B 2250/03; B32B 2250/04; B32B 2315/00; C02F 1/44; C02F 1/441; C02F 1/442; C02F 1/444; C02F 1/445; B01D 35/00; B01D 35/08; B01D 35/14; B01D 67/00; B01D 67/0002; B01D 67/0039; B01D 67/0079; B01D 69/00; B01D 69/06; B01D 69/12; B01D 69/122;
(Continued)

(56) References Cited

U.S. PATENT DOCUMENTS 6,472,016 B1 * 10/2002  Soria ................... B01D 53/228
                                                427/245
8,177,978 B2    5/2012  Kurth et al.
(Continued)

FOREIGN PATENT DOCUMENTS

CN    105879701    8/2016
TW    I460007     11/2014
(Continued)

*Primary Examiner* — Allison G Fitzsimmons
(74) *Attorney, Agent, or Firm* — JCIPRNET

(57) ABSTRACT

A multilayer composite membrane consists essentially of a porous support layer, an inorganic porous layer, a polymer porous layer, and a separation layer. The inorganic porous layer consists of inorganic particles and is disposed on the porous support layer. The polymer porous layer is disposed on the inorganic porous layer. The separation layer is disposed on the polymer porous layer.

8 Claims, 1 Drawing Sheet

(51) Int. Cl.
  *B32B 5/02* (2006.01)
  *B32B 5/24* (2006.01)
  *B32B 5/30* (2006.01)
  *B32B 9/04* (2006.01)
  *B01D 71/56* (2006.01)
  *B01D 69/10* (2006.01)
  *B01D 61/00* (2006.01)
  *C02F 1/44* (2006.01)

(52) U.S. Cl.
  CPC ............ *B32B 5/022* (2013.01); *B32B 5/16* (2013.01); *B32B 5/24* (2013.01); *B32B 5/30* (2013.01); *B32B 9/045* (2013.01); *B32B 9/048* (2013.01); *C02F 1/445* (2013.01); *B32B 2262/02* (2013.01); *B32B 2264/108* (2013.01); *B32B 2307/732* (2013.01)

(58) Field of Classification Search
  CPC ...... B01D 69/125; B01D 71/00; B01D 71/02; B01D 71/021; B01D 71/06
  USPC .. 210/348, 652, 500.38, 500.37, 502.1, 490, 210/650, 45.1, 493.1, 493.4, 493.5, 210/497.01, 497.1, 500.21, 504, 506, 507, 210/508, 509, 500.1, 503; 264/245, 41, 264/243, 650, 45.1
  See application file for complete search history.

(56) References Cited

U.S. PATENT DOCUMENTS

| | | | |
|---|---|---|---|
| 8,567,612 | B2 | 10/2013 | Kurth et al. |
| 8,603,340 | B2 | 12/2013 | Kurth et al. |
| 8,920,654 | B2 | 12/2014 | Revanur et al. |
| 9,010,547 | B2 | 4/2015 | Chu et al. |
| 9,216,391 | B2 | 12/2015 | Revanur et al. |
| 9,227,360 | B2 | 1/2016 | Lulevich et al. |
| 9,254,465 | B2 | 2/2016 | Kurth et al. |
| 9,687,792 | B2 | 6/2017 | Goenaga et al. |
| 9,695,065 | B2 | 7/2017 | Koehler et al. |
| 2008/0237126 | A1* | 10/2008 | Hoek ............ B01D 67/0079 210/637 |
| 2010/0062156 | A1* | 3/2010 | Kurth ............ B01D 61/002 427/243 |
| 2010/0206811 | A1 | 8/2010 | Ng et al. |
| 2012/0012527 | A1* | 1/2012 | Allen ............ B01D 61/025 210/654 |
| 2012/0080381 | A1 | 4/2012 | Wang et al. |
| 2014/0087304 | A1 | 3/2014 | Uno et al. |

FOREIGN PATENT DOCUMENTS

| | | |
|---|---|---|
| TW | I493777 | 7/2015 |
| TW | 201737531 | 10/2017 |
| WO | 2009035415 | 3/2009 |
| WO | 2011028541 | 3/2011 |

\* cited by examiner

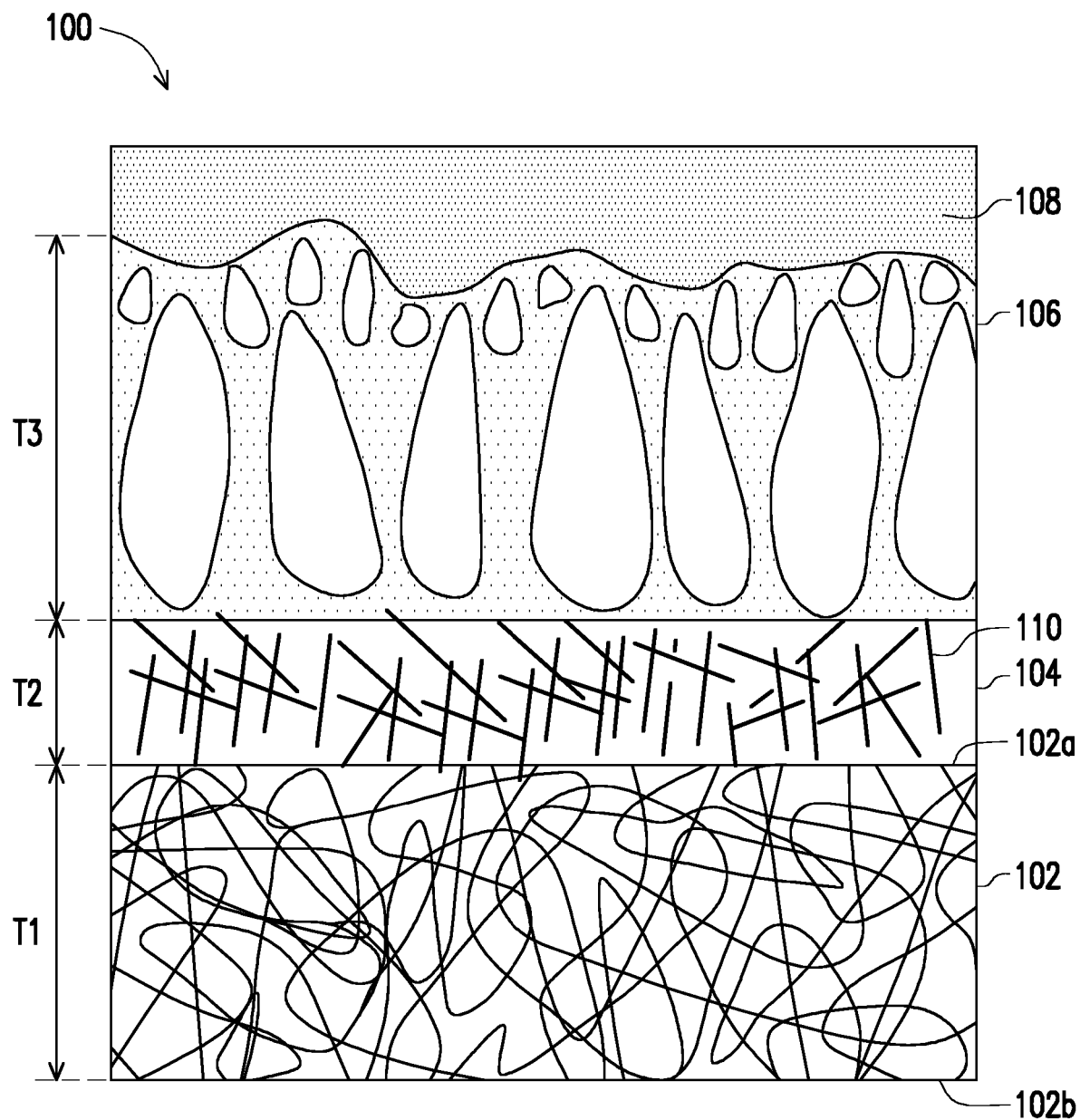

MULTILAYER COMPOSITE MEMBRANE

CROSS-REFERENCE TO RELATED APPLICATION

This application claims the priority benefits of Taiwan application serial no. 107121273, filed on Jun. 21, 2018. The disclosure of which is hereby incorporated by reference herein in its entirety.

TECHNICAL FIELD

The disclosure relates to a multilayer composite membrane for a water treatment technology.

BACKGROUND

Currently, the composite membrane is extensively applied in water treatments, e.g. such as ultrafiltration, microfiltration, reverse osmosis, forward osmosis, etc.

In a traditional composite membrane structure, the upper layer is a porous layer, and the lower layer is a reinforced layer in order to increase mechanical strength. This reinforced layer can be a woven fabric or a non-woven fabric, even other materials capable of reinforcement. However, when the reinforcement layer and the polymer solution of the upper layer thereon are combined, due to issues such as viscosity, the polymer solution for of the porous layer penetrate into the reinforced layer, such that the reinforced layer with a large-resistance interface layer is formed after film-forming. The interface layer causes an increase in the resistance of the composite membrane such that the membrane performance is affected.

This phenomenon is more severe in forward osmosis techniques. Since liquid flows at both sides of the composite membrane for forward osmosis, very severe internal concentration polarization occurs at the side of the reinforced layer, and the interface layer having a large resistance worsens the internal concentration polarization issue.

Increasing the viscosity of the polymer solution of the porous layer can prevent the porous layer from penetrating into the reinforced layer and forming an interface layer having a large resistance. However, changing the viscosity of the polymer solution may result in a denser membrane structure having greater resistance, and water flux is reduced as a result. Therefore, an interface layer having a high resistance while maintaining water flux is an important topic in forward osmosis membranes.

SUMMARY

A multilayer composite membrane of the disclosure consists essentially of a porous support layer, an inorganic porous layer, a polymer porous layer, and a separation layer. The inorganic porous layer consists of inorganic particles, and it is located on the porous support layer. The polymer porous layer is located on the inorganic porous layer, and the separation layer is located on the polymer porous layer.

Based on the above, in the multilayer composite membrane of the disclosure, an inorganic porous layer is sandwiched by the porous support layer and the polymer porous layer. Since the inorganic porous layer consists of the inorganic particles, the pores of the porous support layer can be reduced (blocked) by the inorganic particles to prevent the polymer solution from penetrating during the film-forming process so as to prevent the forming of a high-resistance interface layer. As a result, the issue of internal concentration polarization can be alleviated.

Several exemplary embodiments accompanied with FIGURE are described in detail below to further describe the disclosure in details.

BRIEF DESCRIPTION OF THE DRAWINGS

The accompanying drawing is included to provide further understanding, and is incorporated in and constitutes a part of this specification. The drawing illustrates exemplary embodiments and, together with the description, serves to explain the principles of the disclosure.

FIG. 1 is a cross section of a multilayer composite membrane according to an embodiment of the disclosure.

DETAILED DESCRIPTION OF DISCLOSED EMBODIMENTS

Embodiments are provided hereinafter and described in detail with reference to FIGURE. However, the embodiments provided are not intended to limit the scope of the disclosure. Moreover, the FIGURE is only descriptive and not drawn to scale, and different layers may be enlarged or shrunk to be shown in a single FIGURE.

FIG. 1 is a cross section of a multilayer composite membrane according to an embodiment of the disclosure.

Referring to FIG. 1, a multilayer composite membrane 100 of the present embodiment consists essentially of a porous support layer 102, an inorganic porous layer 104, a polymer porous layer 106, and a separation layer 108. The porous support layer 102 has a porous structure, and the two sides thereof are connected to each other. In other words, if a solution enters the porous support layer 102 from a surface 102a, then the solution exits from another surface 102b. The porous support layer 102 can be formed by a woven fabric or a non-woven fabric. The non-woven fabric is a fabric formed by the high-pressure or adhesion production of a fiber. The material of the porous support layer 102 is, for instance, polypropylene, polyethylene terephthalate, polyamide, or a derivative thereof, but the disclosure is not limited thereto. The porous support layer 102 can increase the mechanical strength of the multilayer composite membrane 100 and increase the durability of the multilayer composite membrane 100. In the present embodiment, a thickness T1 of the porous support layer 102 is, for instance, between 30 microns ($\mu$m) and 130 microns.

Referring further to FIG. 1, the inorganic porous layer 104 is disposed on the porous support layer 102. The inorganic porous layer 104 consists of inorganic particles 110, and therefore the inorganic particles 110 locate on the surface 102a of the porous support layer 102 and fill the pores of the porous support layer 102 opportunely. Therefore, when the polymer porous layer 106 is subsequently formed, a polymer solution can be prevented from penetrating into the porous support layer 102 and forming an interface layer having high resistance to reduce the membrane performance. The inorganic particles 110 of the inorganic porous layer 104 can include, but are not limited to, silicon nanoparticles, carbon nanotubes (CNT), graphene, zeolite, or a combination thereof. The inorganic particles 110 are bonded together via a non-covalent bond, and the non-covalent bond is, for instance, Van der Waals force. A thickness T2 of the inorganic porous layer 104 is, for instance, between 3 microns and 10 microns. If the thickness T2 of the inorganic porous layer 104 is less than 3 microns, then the inorganic porous layer 104 may not completely cover the porous support layer 102; if the thickness T2 is greater than 10 microns, the resistance is too large to let water pass through the membrane readily. However, the disclosure is not limited thereto, and the solution concentration in the manufacture of the inorganic porous layer 104 also affects the effectiveness of the inorganic porous layer 104. If the inorganic particles 110 are CNT, then 0.1 wt % or more of the CNT solution can be used to ensure the inorganic porous layer 104 can cover the porous support layer 102, such as using 0.1 wt % to 5 wt % of the CNT solution.

Referring further to FIG. 1, the polymer porous layer 106 of the present embodiment is disposed on the inorganic porous layer 104. Similarly, the polymer porous layer 106 has a porous structure connected to the pores of the inorganic porous layer 104. The material of the polymer porous layer 106 can produce pores and has viscosity, and it can be blocked by the inorganic porous layer 104. For instance, the material of the polymer porous layer 106 includes polyacrylonitrile, polysulfone, polyether sulfone, polyvinylidene fluoride, a derivative thereof, or a combination thereof. A thickness T3 of the polymer porous layer 106 is, for instance, between 30 microns and 60 microns. The polymer porous layer 106 can form a 3D structure to secure the inorganic porous layer 104 so as to prevent damage thereto during operation. The separation layer 108 is disposed on the polymer porous layer 106. The separation layer 108 is a non-porous material layer and can block salt particles in water. The material of the separation layer 108 is, for instance, polyamide, and can be formed by the polymerization of m-phenylenediamine and trimesoyl chloride.

To validate the efficacies of the disclosure, experiments are provided below. However, the disclosure is not limited to the following content.

Experimental Example 1

First, a non-woven fabric having a base weight of 50 g/m² and a thickness of 66 microns was secured on a glass plate, and then a CNT solution having a solid content of 3 wt % was prepared. After the CNT solution was evenly dispersed, the CNT solution was coated on a surface of a non-woven fabric via a 52-micron coating bar, and then the non-woven fabric was placed in an oven at 50° C. for drying for 15 minutes. After drying completely, the CNT/non-woven fabric cooled at room temperature.

A 12 wt % polymer solution of polyacrylonitrile (PAN) and N-methylpyrrolidone (NMP) was prepared, and the polymer solution was placed in an oven at 50° C. until the polymer solution was completely dissolved. After the temperature of the polymer solution was lowered to room temperature, the polymer solution was coated on the CNT/non-woven fabric in a thickness of 30 microns, and then the CNT/non-woven fabric was placed in water for phase separation. After the solvent was completely exchanged, the CNT/non-woven fabric was taken out from the water and placed in a 2 wt % m-phenylenediamine (MPD) aqueous solution for two minutes, and then reacted via a 0.1 wt % trimethylbenzene chloride (TMC) solution for 1 minute to form an interfacial polymerized separation layer. After the reaction was complete, the resulting multilayer composite membrane was evenly placed in deionized water before testing.

The results of a forward osmosis performance test performed on the resulting composite membrane in experimental example 1 are shown in Table 1 below.

Experimental Example 2

In experimental example 2, the same process as experimental example 1 was used. The difference between experimental example 2 and experimental example 1 is that, the concentration of the PAN/NMP polymer solution was changed from 12 wt % to 15 wt %.

The results of a forward osmosis performance test performed on the resulting composite membrane in experimental example 2 are shown in Table 1 below.

Comparative Example 1

The multilayer composite membrane was prepared using the same method as experimental example 1, but the inorganic porous layer was omitted.

The results of a forward osmosis performance test performed on the resulting composite membrane in comparative example 1 are shown in Table 1 below.

Experimental Example 3

The same process as experimental example 1 was used. The difference between experimental example 3 and experimental example 1 is that 1 wt % of a polyvinyl alcohol polymer was added in the CNT solution, and the rest of the experimental parameters were all the same as those of experimental example 1.

TABLE 1

|  | Water flux $J_w$ (LMH) | Reverse solute flux $J_s$ (gMH) |
| --- | --- | --- |
| Experimental example 1 | 10.5 | 5.9 |
| Experimental example 2 | 8.7 | 3.8 |
| Comparative example 1 | 5.3 | 4.9 |
| Experimental example 3 | 8.3 | 4.6 |

It can be obtained from Table 1 that, the water flux of the multilayer composite membrane of the disclosure is better than that of comparative example 1, and the reverse solute flux is maintained within a standard range (10 or less).

Based on the above, in the disclosure, since an inorganic porous layer formed by inorganic particles is disposed between the porous support layer and the polymer porous layer, the pores of the porous support layer can be reduced (blocked) by the inorganic particles to prevent the polymer solution from penetrating during the film-forming process, and thus it can avoid the forming of a high-resistance interface layer. As a result, the issue of internal concentration polarization is alleviated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A multilayer composite membrane consisting essentially of the following layers:
    a porous support layer;
    an inorganic porous layer consisting of a plurality of inorganic particles and located on the porous support layer;
    a polymer porous layer located on the inorganic porous layer, the polymer porous layer has a porous structure connected to pores of the inorganic porous layer, wherein a thickness of the polymer porous layer is 30 microns to 60 microns; and a separation layer located on the polymer porous layer.

2. The composite membrane of claim 1, wherein the porous support layer comprises a woven fabric or a non-woven fabric.

3. The composite membrane of claim 1, wherein a material of the porous support layer comprises polypropylene, polyethylene terephthalate, polyamide, or a derivative thereof.

4. The composite membrane of claim 1, wherein a thickness of the porous support layer is 30 microns to 130 microns.

5. The composite membrane of claim 1, wherein a material of the inorganic particles comprises silicon nanoparticles, carbon nanotubes, graphene, zeolite, or a combination thereof.

6. The composite membrane of claim 1, wherein a thickness of the inorganic porous layer is 3 microns to 10 microns.

7. The composite membrane of claim 1, wherein a material of the polymer porous layer comprises polyacrylonitrile, polysulfone, polyether sulfone, polyvinylidene fluoride, or a derivative thereof.

8. The composite membrane of claim 1, wherein a material of the separation layer comprises polyamide.

* * * * *